US010723401B2

(12) United States Patent
Matsushima et al.

(10) Patent No.: US 10,723,401 B2
(45) Date of Patent: Jul. 28, 2020

(54) VEHICLE BODY STRUCTURE OF SADDLE TYPE VEHICLE

(71) Applicant: HONDA MOTOR CO., LTD., Minato-ku, Tokyo (JP)

(72) Inventors: Satoshi Matsushima, Wako (JP); Toru Sasaki, Atsugi (JP)

(73) Assignee: HONDA MOTOR CO., LTD., Tokyo (JP)

(*) Notice: Subject to any disclaimer, the term of this patent is extended or adjusted under 35 U.S.C. 154(b) by 278 days.

(21) Appl. No.: 15/906,052

(22) Filed: Feb. 27, 2018

(65) Prior Publication Data

US 2018/0273124 A1 Sep. 27, 2018

(30) Foreign Application Priority Data

Mar. 27, 2017 (JP) ................................ 2017-061215

(51) Int. Cl.

*B62J 1/08* (2006.01)
*B62J 35/00* (2006.01)
*B62M 7/06* (2006.01)
*B62K 11/04* (2006.01)
*B62K 11/06* (2006.01)

(52) U.S. Cl.

CPC ................ *B62J 1/08* (2013.01); *B62J 35/00* (2013.01); *B62K 11/04* (2013.01); *B62K 11/06* (2013.01); *B62M 7/06* (2013.01)

(58) Field of Classification Search

CPC . B62J 1/08; B62K 11/06; B62K 11/04; B62K 11/02

See application file for complete search history.

(56) References Cited

U.S. PATENT DOCUMENTS 4,461,366 A * 7/1984 Honda .................. B62K 11/04 165/41
4,696,366 A 9/1987 Hattori
4,706,774 A * 11/1987 Tsuboi .................. B62K 11/04 180/227
4,852,678 A * 8/1989 Yamaguchi ........... B62K 11/04 180/219

(Continued)

FOREIGN PATENT DOCUMENTS

CN 1738741 2/2006
EP 2468612 6/2012

(Continued)

OTHER PUBLICATIONS

Extended European Search Report for European Patent Application No. 18159356.7 dated Aug. 13, 2018.

(Continued)

*Primary Examiner* — Jacob D Knutson
*Assistant Examiner* — Conan D Duda
(74) *Attorney, Agent, or Firm* — Amin, Turocy & Watson, LLP

(57) ABSTRACT

This vehicle body structure of a saddle type vehicle includes a rear vehicle body mono-frame (22) having a merging portion (**22*a*) configured to merge a pair of right and left front vehicle body frames (21) provided with at least a part of a fuel tank (8) interposed therebetween behind the fuel tank (8) and below a seat (9), and also configured to extend continuously to the front vehicle body frames (21**).

7 Claims, 7 Drawing Sheets

(56) References Cited

U.S. PATENT DOCUMENTS 4,887,688 A * 12/1989 Horiike .................... B62J 17/00 180/229
4,984,650 A * 1/1991 Horiike .................. B62K 11/04 180/227
5,012,883 A 5/1991 Hiramatsu
5,921,339 A * 7/1999 Matsuura ............... B62K 11/04 180/219
6,290,017 B1 * 9/2001 Ito .......................... B62K 11/06 180/219
7,753,157 B1 * 7/2010 Woods ................... B62K 11/06 180/205.5
2005/0263334 A1 * 12/2005 Okabe .................... B62K 11/06 180/219
2007/0012500 A1 * 1/2007 Brown ................... B62K 11/06 180/219
2007/0056790 A1 * 3/2007 Shigeta .................... B62J 17/02 180/225
2007/0193805 A1 * 8/2007 Adachi .................. B62K 11/04 180/219
2009/0194353 A1 * 8/2009 Kato ........................ B62J 23/00 180/311
2009/0194355 A1 * 8/2009 Yamamoto ............. B62K 11/04 180/312
2009/0194356 A1 * 8/2009 Kato ...................... B62K 11/04 180/312
2011/0308874 A1 * 12/2011 Tanaka ............. B60K 15/03504 180/219
2012/0161417 A1 * 6/2012 Kawai .................. B60T 8/3685 280/281.1
2012/0161418 A1 * 6/2012 Kawai .................... B62K 11/04 280/281.1
2012/0187654 A1 * 7/2012 Kawai .................. B60T 8/3685 280/288.4
2013/0026733 A1 * 1/2013 Oe ......................... B62K 11/04 280/281.1
2014/0060955 A1 * 3/2014 Kono ................... F02M 35/162 180/291
2014/0116794 A1 * 5/2014 Kawai .................... B62K 11/04 180/68.1
2014/0183837 A1 * 7/2014 Ishii ....................... B62K 11/04 280/284
2014/0262571 A1 * 9/2014 Murayama ............. B62K 11/04 180/68.3
2014/0265230 A1 * 9/2014 Oikawa .................... B62J 35/00 280/281.1
2015/0101875 A1 * 4/2015 Inayama ............... F02B 37/183 180/225
2015/0232150 A1 * 8/2015 Kosuge ................... B60L 53/12 180/220
2015/0259019 A1 * 9/2015 Ito ............................. B62J 6/04 362/473
2015/0314825 A1 * 11/2015 Midy ....................... B62J 35/00 180/225
2016/0096582 A1 * 4/2016 Kawai .................... B62K 25/04 180/227
2016/0096583 A1 * 4/2016 Kawai .................... B62K 25/04 180/227
2016/0144924 A1 * 5/2016 Sugita .................... B62K 11/04 180/227
2017/0183055 A1 * 6/2017 Takaya ................... B62K 11/04
2019/0152556 A1 * 5/2019 Yamamoto ................. B62J 1/08
2019/0203835 A1 * 7/2019 Sugano .................. B62K 11/04

FOREIGN PATENT DOCUMENTS

EP 3006320 4/2016
JP 62-064680 3/1987
JP 05-345585 12/1993
JP 4247839 4/2009
JP 4727315 7/2011

OTHER PUBLICATIONS

Chinese Office Action for Chinese Patent Application No. 201810237549.0 dated Sep. 17, 2019.
Japanese Office Action for Japanese Patent Application No. 2017-061215 dated Oct. 1, 2019.

* cited by examiner

VEHICLE BODY STRUCTURE OF SADDLE TYPE VEHICLE

CROSS-REFERENCE TO RELATED APPLICATION

The present application claims priority based on Japanese Patent Application No. 2017-061215 filed Mar. 27, 2017, the content of which is incorporated herein by reference.

BACKGROUND OF THE INVENTION

Field of the Invention

The present invention relates to a vehicle body structure of a saddle type vehicle.

Description of Related Art

Conventionally, in a vehicle body structure of a saddle type vehicle, there is a structure in which a twin tube is connected to two pivot frames below a seat. In Japanese Patent No. 4247839 and Japanese Patent No. 4727315, there is disclosed a structure in which rear ends of right and left sub-frame members disposed on a lower side of right and left main frame members are coupled to a central cross member, and right and left lower frame members are provided on a lower side of the central cross member.

SUMMARY OF THE INVENTION

However, since the seat is provided above the two right and left lower frame members, there is a possibility that a straddling property of the seat may be impaired.

Accordingly, an aspect of the present invention is to improve a straddling property of a seat in a vehicle body structure of a saddle type vehicle.

To achieve the above object, a vehicle body structure of a saddle type vehicle according to an aspect of the present invention employs the following constitution.

(1) One aspect of the present invention provides a vehicle body structure of a saddle type vehicle including a rear vehicle body mono-frame having a merging portion configured to merge a pair of right and left front vehicle body frames provided with at least a part of a fuel tank interposed therebetween behind the fuel tank and below a seat, and also configured to extend continuously to the front vehicle body frames.

(2) In the aspect of (1), the merging portion may be located in front of an imaginary line configured to connect a middle point of the seat in a forward and rearward direction with a step in a side view.

(3) In the aspect of (1), the rear vehicle body mono-frame may have a hollow structure, an exhaust component may be provided on one side of the rear vehicle body mono-frame, and an electrical component may be provided on the other side thereof.

(4) In the aspect of (1), the rear vehicle body mono-frame may include an engine installing portion on which an engine is installed, and a cushion installing portion on which a cushion is installed.

(5) In the aspect of (4), the engine installing portion and the cushion installing portion may vertically overlap each other at least partially in a side view.

(6) In the aspect of (1), the rear vehicle body mono-frame may include a fuel tank installing portion on which the fuel tank is installed.

(7) In the aspect of (1), the fuel tank may be provided on the same axial line as a cushion axial line.

(8) In the aspect of (7), the rear vehicle body mono-frame may include a fuel tank installing portion on which the fuel tank is installed, and the fuel tank installing portion may be supported by a cushion installing portion on which a cushion is installed.

(9) In the aspect of (1), the rear vehicle body mono-frame may include a cushion installing portion on which a cushion is installed, and a reinforcing portion configured to reinforce the cushion installing portion, and a welded portion of a seat frame may be provided to surround an outer circumference of a joint portion between the cushion installing portion and the reinforcing portion.

According to the aspect of (1), since the merging portion configured to merge the pair of right and left front vehicle body frames provided with at least a part of the fuel tank interposed therebetween behind the fuel tank and below the seat, and the rear vehicle body mono-frame configured to extend continuously to the front vehicle body frames are included, a vehicle width can be narrowed as compared with a constitution in which two frames are provided below the seat. Therefore, a straddling property of the seat can be improved. Further, since the pair of right and left front vehicle body frames are merged behind the fuel tank and below the seat, the front vehicle body frame can be disposed to avoid an arrangement position of the fuel tank, and thus a degree of freedom of a shape of the fuel tank is increased, and a capacity of the fuel tank can be easily secured.

According to the aspect of (2), since the merging portion is located in front of an imaginary line which connects a middle point of the seat in a forward and rearward direction with a step in the side view, the vehicle width can be narrowed in a range in which a driver crosses the seat and moves her or his foot toward the step (a region behind the imaginary line) as compared with the case in which the merging portion is located behind the imaginary line in a side view, and thus the straddling property of the seat can be further improved.

According to the aspect of (3), since an exhaust component is provided on one side of the rear vehicle body mono-frame and an electric component is provided on the other side thereof, the exhaust component and the electric component can be arranged compactly in a vehicle width direction. Also, since the rear vehicle body mono-frame has the hollow structure, the rear vehicle body mono-frame serves as a heat insulating structure, and thus it is possible to prevent thermal influence between the exhaust component and the electric component.

According to the aspect of (4), since the rear vehicle body mono-frame includes the engine installing portion on which an engine is installed and the cushion installing portion on which the cushion is installed, a load from the cushion can be transmitted to the engine through the rear vehicle body mono-frame, and thus the engine can be further used as a rigid member which receives a load from a rear of the vehicle.

According to the aspect of (5), since the engine installing portion and the cushion installing portion vertically overlap each other at least partially in a side view, the load from the cushion can be easily received directly by the engine as compared with the case in which the engine installing portion and the cushion installing portion are displaced in the vertical direction, and thus the engine can be further used as the rigid member.

According to the aspect of (6), since the rear vehicle body mono-frame has the fuel tank installing portion on which the fuel tank is installed, it is unnecessary to additionally provide a bracket for installing the fuel tank, and thus the number of components can be reduced, and a weight can be reduced.

According to the aspect of (7), since the fuel tank is provided on the same axial line as the cushion axial line, as compared with the case in which the fuel tank is provided at a position deviated from the cushion axial line, the load from the cushion can be transmitted to the head pipe through the fuel tank in addition to the right and left front vehicle body frame during deceleration or the like, and the front wheel can be further grounded on the ground. Therefore, it is possible to shorten a braking distance.

According to the aspect of (8), since the rear vehicle body mono-frame includes the fuel tank installing portion on which the fuel tank is installed and the fuel tank installing portion is supported by the cushion installing portion on which the cushion is installed, relative positional accuracy between the cushion and the fuel tank can be increased.

According to the aspect of (9), since the rear vehicle body mono-frame includes the cushion installing portion on which the cushion is installed and the reinforcing portion which reinforces the cushion installing portion and a welded portion of the seat frame is provided to surround the outer circumference of the joint portion between the cushion installing portion and the reinforcing portion, stress can be received by the seat frame, and thus the stress can be prevented from being concentrated on the joint portion between the cushion installing portion and the reinforcing portion.

DESCRIPTION OF EMBODIMENTS

Figure 1:
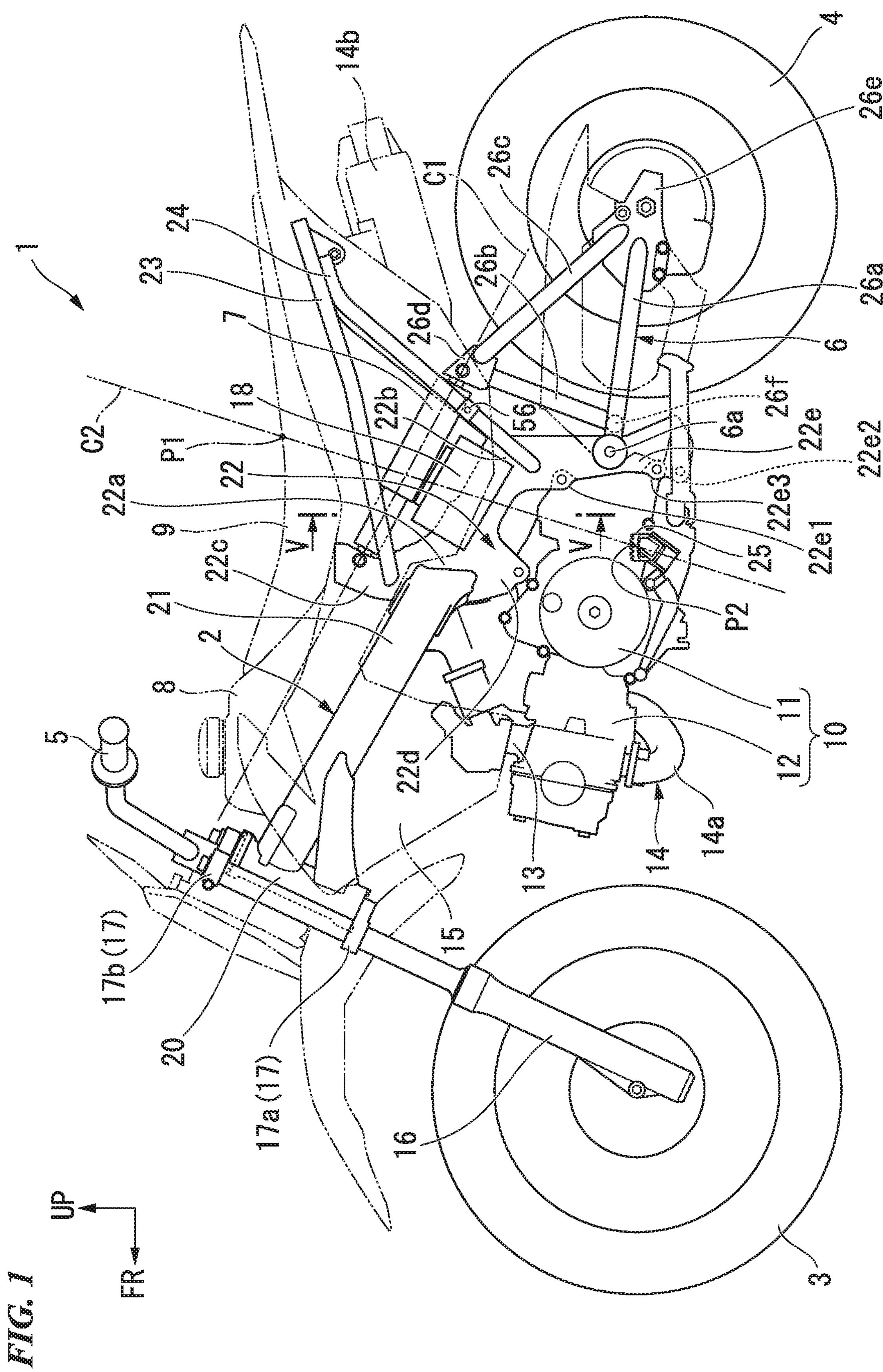
FIG. 1 is a left side view of a motorcycle according to an embodiment of the present invention.

Hereinafter, embodiments of the present invention will be described with reference to the drawings. Further, in the following description, directions such as front, back, right and left are the same as those with respect to a vehicle described below unless otherwise noted. Also, an arrow FR indicating a front of the vehicle, an arrow LH indicating a left side of the vehicle, and an arrow UP indicating an upper side of the vehicle are illustrated at appropriate positions in the drawings used in the following description.

<Entire Vehicle>

FIG. 1 illustrates a motorcycle 1 as an example of a straddle type vehicle. Referring to FIG. 1, the motorcycle 1 includes a front wheel 3 steered by a handle 5, and a rear wheel 4 driven by a power unit 10 including an engine. The motorcycle 1 according to the embodiment is an off-road type motorcycle.

Hereinafter, the motorcycle may be simply referred to as a "vehicle."

Steering system parts including the handle 5 and the front wheel 3 are pivotally and steerably supported by a head pipe 20 formed at a front end portion of a vehicle body frame 2. For example, the handle 5 is a bar handle manufactured by bending a single cylindrical metal handle pipe. A handle steering shaft connected to the handle 5 is inserted through the head pipe 20. The power unit 10 is disposed at a central portion of the vehicle body frame 2 in a forward and rearward direction. A swing arm 6 is disposed on a rear side of the power unit 10. The swing arm 6 is pivotally supported at a rear lower portion of the vehicle body frame 2 to be vertically swingable about a pivot shaft 6*a*.

For example, the vehicle body frame 2 is formed by integrally joining a plurality of types of steel materials by welding or the like. In a side view, the vehicle body frame 2 includes the cylindrical head pipe 20 which is inclined to be located downward as it goes forward and extends vertically, a pair of right and left front vehicle body frames 21 which branch off to right and left sides from an upper rear side of the head pipe 20 and extend rearward and downward, a rear vehicle body mono-frame 22 which has a merging portion 22*a* for merging rear end portions of the right and left front vehicle body frames 21 and extends continuously to the right and left front vehicle body frames 21, a pair of right and left seat frames 23 which extend to be inclined gently from a front upper portion 22*c* of the rear vehicle body mono-frame 22 rearward and upward, and a pair of right and left support frames 24 (left support frame 24L and right support frame 24R) which extend obliquely upward and rearward from a curved portion 22*b* of the rear vehicle body mono-frame 22 toward rear portions of the right and left seat frames 23.

The rear vehicle body mono-frame 22 is a single rear vehicle body frame extending in the forward and rearward direction of the vehicle. Specifically, the rear vehicle body mono-frame 22 extends rearward and downward from the merging portion 22*a*, changes a direction from the curved portion 22*b* and then extends downward from the curved portion 22*b*. Further, the rear vehicle body mono-frame 22 does not include a cross frame extending in a vehicle width direction.

The power unit 10 is installed at a plurality of positions (four positions on one side in the embodiment) of the rear vehicle body mono-frame 22. Specifically, an upper portion of the power unit 10 is installed at one position on one side of a front lower portion 22*d* of the rear vehicle body mono-frame 22. In the rear vehicle body mono-frame 22, a rear portion of the power unit 10 is installed at three positions on one side of a downward extending portion 22*e* extending downward from the curved portion 22*b*. Further, the downward extending portion 22*e* of the rear vehicle body mono-frame 22 constitutes a pivot frame which rotatably supports the pivot shaft 6*a*.

Hereinafter, the front lower portion 22*d* of the rear vehicle body mono-frame 22 is referred to as a "front lower engine installing portion 22*d* (engine installing portion)", an upper engine installing portion of the downward extending portion 22*e* of the rear vehicle body mono-frame 22 is referred to as a "rear upper engine installing portion 22*e*1", a lower engine installing portion of the downward extending portion 22*e* of the rear vehicle body mono-frame 22 is referred to as a "rear lower engine installing portion 22*e*2", and an engine installing portion located at a middle of the downward extending portion 22*e* of the rear vehicle body mono-frame 22 in an upward and downward direction between the rear upper engine installing portion 22*e*1 and the rear lower engine installing portion 22*e*2 is referred to as a "rear middle engine installing portion 22*e*3".

The power unit 10 includes a crankcase 11, and a cylinder portion 12 which protrudes forward and upward from a front portion of the crankcase 11 as viewed from a side (specifically, gently inclines to be located upward as it goes forward) of FIG. 1. An upper portion of the crankcase 11 is installed at the front lower engine mounting portion 22*d*. A rear portion of the crankcase 11 is installed at the rear upper engine installing portion 22*e*1, the rear lower engine installing portion 22*e*2, and the rear middle engine installing portion 22*e*3.

An intake device 13 and an exhaust device 14 are connected to the cylinder portion 12. The intake device 13 includes a throttle body connected to an upper wall of the cylinder portion 12 and communicating with an intake port to adjust an intake air amount, and an air cleaner (not illustrated) which cleans air taken into the throttle body and suctions air into the power unit 10.

The exhaust device 14 includes an exhaust pipe 14*a* (exhaust part) connected to a lower wall of the cylinder portion 12, communicating with an exhaust port, extending rearward and upward under the power unit 10, and then bent to extend forward and rearward at a right side of the power unit 10, and a muffler 14*b* connected to a rear end portion of the exhaust pipe 14*a* and extending obliquely rearward and upward on an upper right side of the rear wheel 4.

A rear cushion 7 (cushion) is provided between the right and left seat frames 23 and the right and left support frames 24 in the vehicle width direction. In a side view of FIG. 1, the rear cushion 7 is inclined rearward and downward along an upper portion (specifically, a portion of the rear vehicle body mono-frame 22 extending rearward and downward from the merging portion 22*a* toward the curved portion 22*b*) of the rear vehicle body mono-frame 22. The rear cushion 7 has a cushion axial line C1 which is inclined rearward and downward.

An upper end portion (front end portion) of the rear cushion 7 is installed at a front upper portion 22*c* of the rear vehicle body mono-frame 22. Hereinafter, the front upper portion 22*c* of the rear vehicle body mono-frame 22 is also referred to as a "cushion installing portion 22*c*". In the side view of FIG. 1, the front lower engine installing portion 22*d* and the cushion installing portion 22*c* are disposed at positions at which they vertically overlap each other at least partially.

Meanwhile, a lower end portion (rear end portion) of the rear cushion 7 is installed at an upper end portion of the swing arm 6. Specifically, the lower end portion of the rear cushion 7 is installed at an upper connecting portion 26*d* connecting upper end portions of two front and rear pipe members 26*b* and 26*c* among three pipe members 26*a*, 26*b* and 26*c* which are elements of the swing arm 6 formed to have a triangle shape in the side view of FIG. 1.

Further, the swing arm 6 includes a pair of right and left support plates 26*e* rotatably supporting a rear wheel axle, a pair of right and left lower pipe members 26*a* extending forward and rearward (specifically, inclined gently to be located upward as they go forward) so that front ends thereof are connected to both end portions of the pivot shaft 6*a* and rear ends thereof are connected to the right and left support plates 26*e*, a cross member 26*f* extending in the vehicle width direction to connect front portions (specifically, portions between the downward extending portion 22*e* of the rear vehicle body mono-frame 22 and the rear wheel 4) of the right and left lower pipe members 26*a* in the vehicle width direction, a front pipe member 26*b* of which a lower end is connected to a central portion of the cross member 26*f* in the vehicle width direction and which is inclined to be located rearward as it goes upward, a pair of right and left rear pipe members 26*c* of which lower ends are connected to the right and left support plates 26*e* and which are inclined to be located forward as they go upward and curved to be located inward in the vehicle width direction as they go upward, and an upper connecting portion 26*d* connecting an upper end portion of the front pipe member 26*b* with upper end portions of the right and left rear pipe members 26*c*.

A fuel tank 8 is installed on the right and left front vehicle body frames 21. A front lower portion of the fuel tank 8 is inserted between the right and left front vehicle body frames 21 from an outside in the vehicle width direction. The fuel tank 8 is provided on the same straight line as the cushion axial line C1. A seat 9 extending along the seat frame 23 in the forward and rearward direction is provided at a rear of the fuel tank 8 and above the rear vehicle body mono-frame 22.

In the side view of FIG. 1, an imaginary line C2 connecting a middle point P1 of the seat 9 in the forward and rearward direction and a center point P2 of a step 25 is set. Here, in the side view of FIG. 1, the center point P2 of the step 25 is a middle point of a foot resting surface (upper surface) of the step 25 in the forward and rearward direction.

In the side view of FIG. 1, the merging portion 22*a* is located in front of the imaginary line C2. Specifically, a connecting portion (merging portion 22*a*) to which rear end portions of the right and left front vehicle body frames 21 are connected with respect to the rear vehicle body mono-frame 22 is located in front of the imaginary line C2.

Further, in FIG. 1, a reference numeral 15 indicates a cowl which covers the vehicle body frame 2 from the outside in the vehicle width direction, a reference numeral 16 indicates a pair of right and left front forks disposed on right and left sides of the front wheel 3, a reference numeral 17 indicates a steering stem which supports upper portions of the right and left front forks 16 to the head pipe 20, a reference numeral 17*a* indicates a bottom bridge of the steering stem 17, a reference numeral 17*b* indicates a top bridge of the steering stem 17, and a reference numeral 18 indicates a battery (electric component).

<Rear Vehicle Body Mono-Frame>

Figure 2:
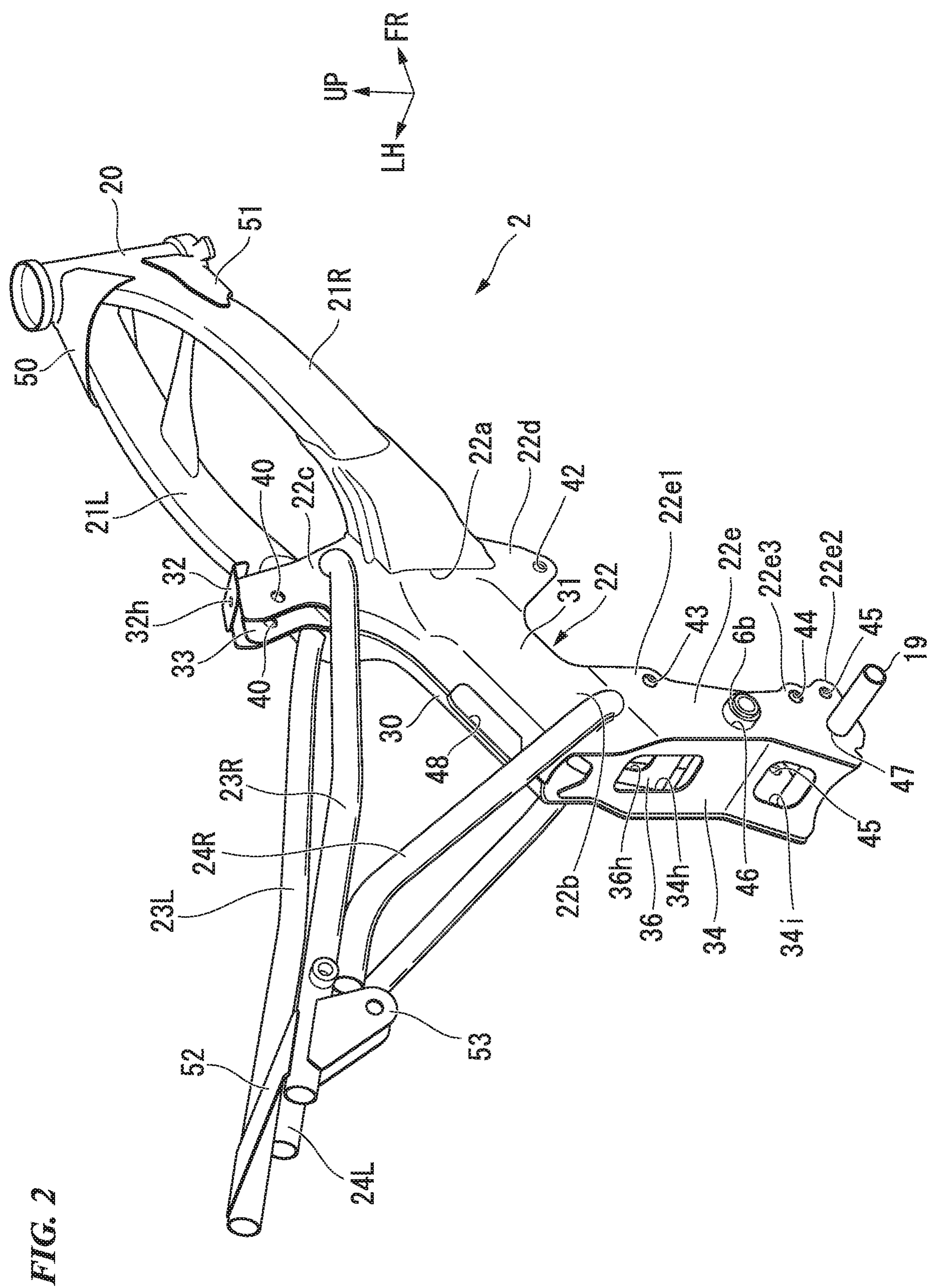
FIG. 2 is a perspective view of a vehicle body structure of the motorcycle.

As illustrated in FIG. 2, the rear vehicle body mono-frame 22 of the vehicle body frame 2 is formed by integrally joining a plurality of types of steel materials by welding or the like. Hereinafter, in the elements of the vehicle body frame 2, "L" may be attached to components disposed on the left side, and "R" may be attached to components disposed on the right side.

The rear vehicle body mono-frame 22 includes a left side panel 30 having the merging portion 22*a* for merging a rear end portion of a left front vehicle body frame 21L and extending in the forward and rearward direction of the vehicle (specifically, extending rearward and downward from the merging portion 22*a*, changing a direction from the curved portion 22*b* and then extending downward from the curved portion 22*b*), a right side panel 31 having the merging portion 22*a* for merging a rear end portion of a right front vehicle body frame 21R, having substantially the same shape as the left side panel 30 in a side view and facing the left side panel 30 in the vehicle width direction, an upper panel 32 coupled to front upper ends of the right and left side panels 31 and 30, a reinforcing panel 33 (reinforcing portion) coupled to inner surfaces of the front upper portions 22*c* of the right and left side panels 31 and 30, a rear panel 34 vertically extending along a rear end edge of the downward extending portion 22*e* to connect rear ends of the right and left side panels 31 and 30 in the vehicle width direction, a first inner panel 35 (refer to FIG. 5) extending forward and rearward to connect front portions of the right and left side panels 31 and 30 in the vehicle width direction, and a second inner panel 36 extending obliquely rearward and downward to connect the curved portions 22*b* of the right and left side panels 31 and 30 in the vehicle width direction.

A plurality of through-holes 40 to 47 are formed in the right and left side panels 31 and 30.

Specifically, a first through-hole 40 through which a shaft portion (for example, a shaft portion of a bolt) (not illustrated) rotatably supporting an upper end portion (refer to FIG. 1) of the rear cushion 7 is inserted is formed in the front upper portions 22*c* of the right and left side panels 31 and 30.

In the front upper portions 22*c* of the right and left side panels 31 and 30, a second through-hole 41 (refer to FIG. 3) for welding the right and left side panels 31 and 30 and the reinforcing panel 33 is formed in front of and below the first through-hole 40.

A third through-hole 42 through which a fastening member (for example, a shaft portion of a bolt) (not illustrated) for fixing the upper portion of the crankcase 11 (refer to FIG. 1) is inserted is formed in the front lower portions 22*d* of the right and left side panels 31 and 30.

A fourth through-hole 43, a fifth through-hole 44 and a sixth through-hole 45 through which a fastening member (for example, a shaft portion of a bolt) (not illustrated) for fixing the rear portion of the crankcase 11 is inserted are formed in the downward extending portions 22*e* (specifically, the rear upper engine installing portion 22*e*1, the rear lower engine installing portion 22*e*2 and the rear middle engine installing portion 22*e*3) of the right and left side panels 31 and 30.

A seventh through-hole 46 for welding a shaft support portion 6*b* which rotatably supports the pivot shaft 6*a* (refer to FIG. 1) is formed in a vertically central portion between the downward extending portions 22*e* of the right and left side panels 31 and 30.

An eighth through-hole 47 for welding a connecting shaft 19 to which a right pedal (not illustrated) is connected is formed in lower ends of the downward extending portions 22*e* of the right and left side panels 31 and 30.

Further, an opening portion 48 having an elongated hole shape which opens vertically to correspond to concave portions (cutout portions) is formed above the curved portions 22*b* of the right and left side panels 31 and 30. Accordingly, weight reduction of the rear vehicle body mono-frame 22 can be achieved.

Figure 3:
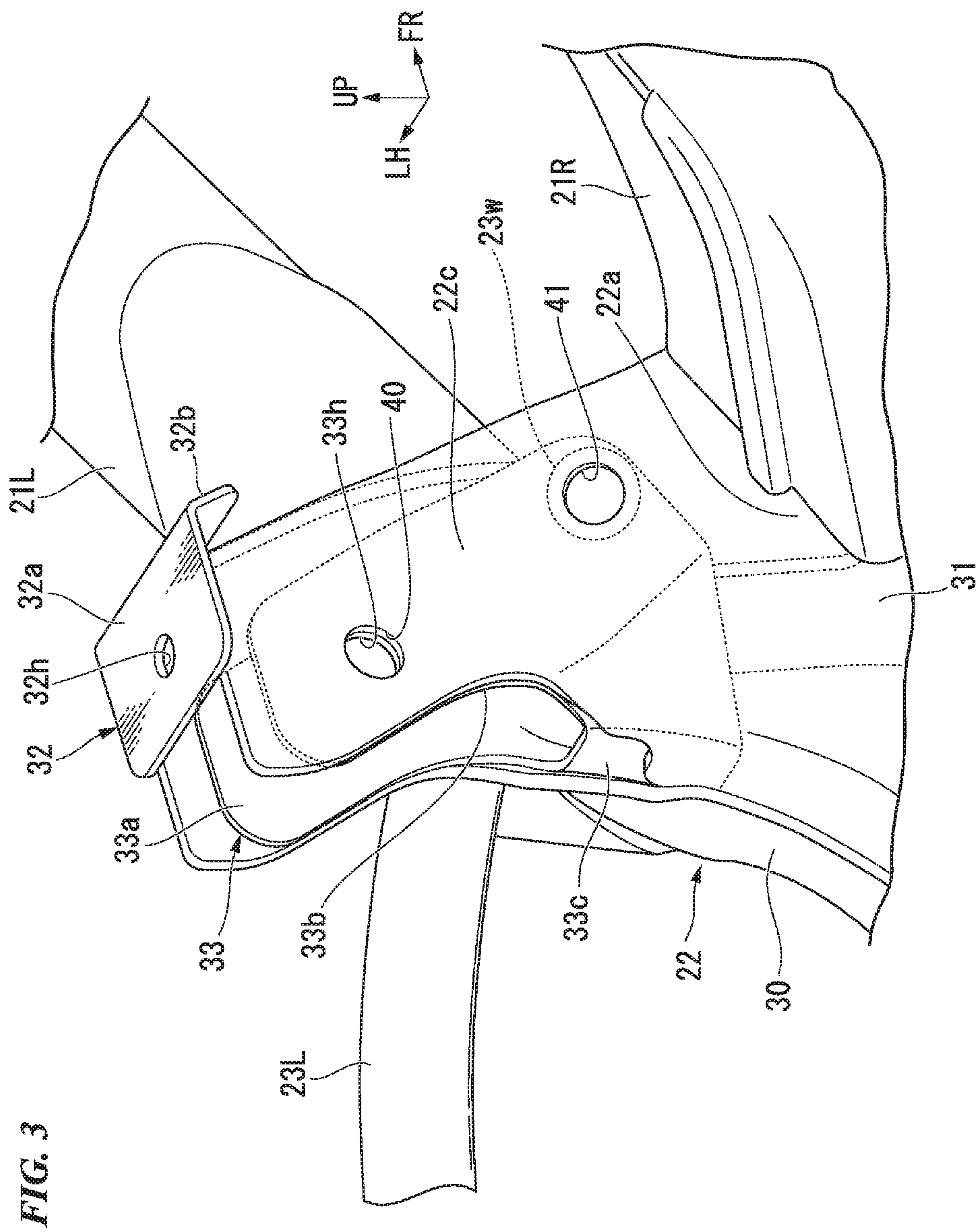
FIG. 3 is a perspective view of a cushion installing portion in the vehicle body structure of the motorcycle.
Figure 4:
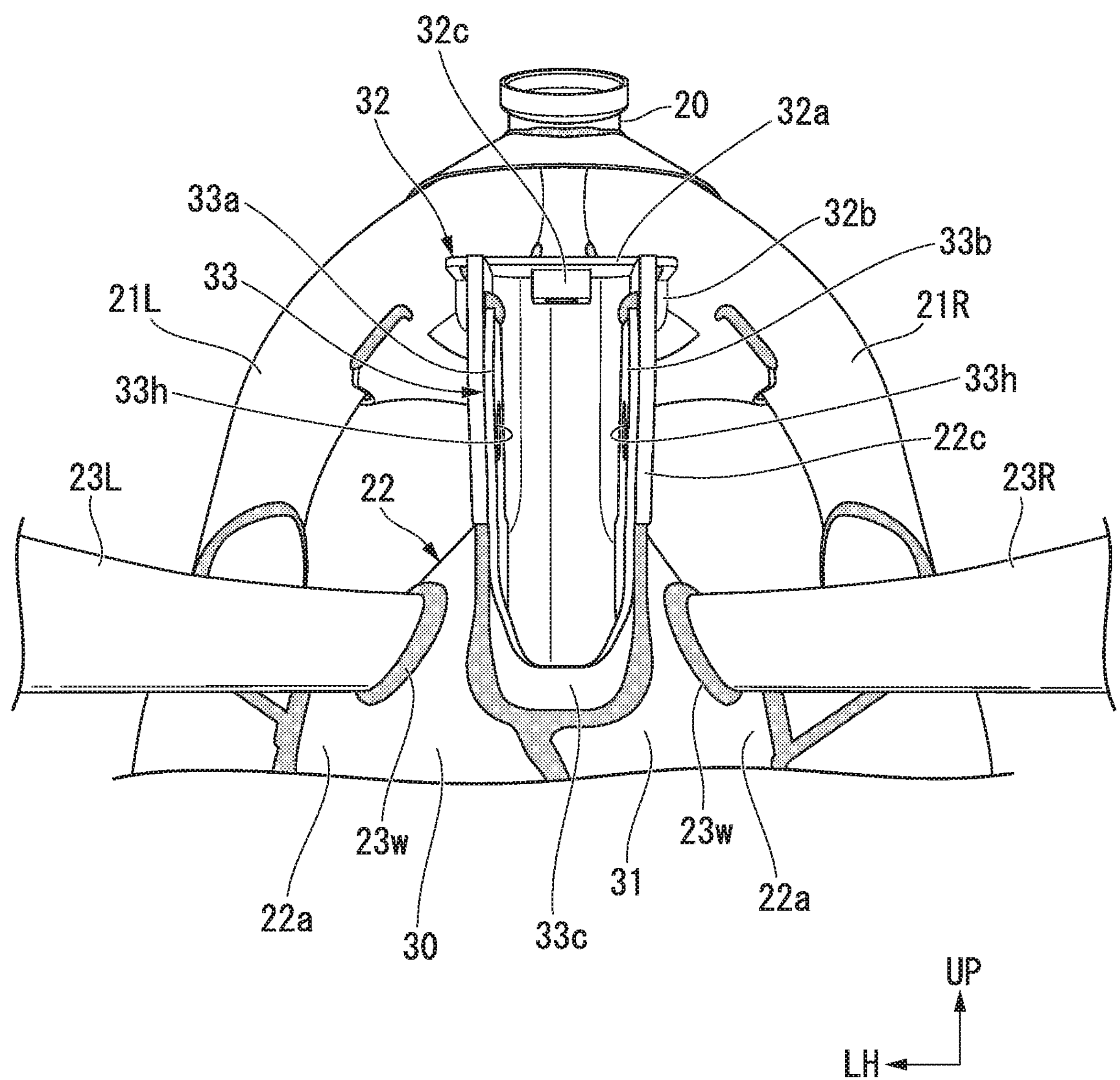
FIG. 4 is a rear view of the vehicle body structure of the motorcycle.

In FIG. 4, hatched portions (dot-hatched portions) indicate welded portions. As illustrated in FIG. 4, front end portions of the right and left seat frames 23R and 23L are welded to the front upper portions 22*c* of the right and left side panels 31 and 30. Specifically, a welded portion 23*w* between front ends of the right and left seat frames 23R and 23L is provided to surround an outer circumference of a joint portion 41 (the circular second through-hole 41 illustrated in FIG. 3) between the cushion installing portion 22*c* and the reinforcing panel 33. Further, in FIG. 3, illustration of the right seat frame 23R is omitted.

As illustrated in FIG. 3, the upper panel 32 includes a rectangular-shaped fuel tank installing portion 32*a* at which a rear end portion of the fuel tank 8 (refer to FIG. 1) is installed and which has a long length in the vehicle width direction as seen from an upper side, and an extending piece 32*b* extending forward and downward from a front end of the fuel tank installing portion 32*a*. A fuel tank fixing hole 32*h* through which a fastening member (for example, a shaft portion of a bolt) (not illustrated) for fixing the rear end portion of the fuel tank 8 (refer FIG. 1) via an elastic member (not illustrated) such as a rubber bush is inserted is formed in the fuel tank installing portion 32*a*.

As illustrated in FIG. 4, a lower surface of the fuel tank installing portion 32*a* of the upper panel 32 is welded to front upper ends of the right and left side panels 31 and 30. Further, a nut 32*c* (for example, a weld nut) to which a fastening member (for example, a shaft portion of a bolt) (not illustrated) for fixing the rear end portion of the fuel tank 8 (refer to FIG. 1) is screwed is provided on the lower surface of the fuel tank installing portion 32*a*.

In a rear view of FIG. 4, the reinforcing panel 33 has a U shape. As illustrated in FIG. 3, the reinforcing panel 33 includes a left reinforcing panel portion 33*a* coupled to an inner surface of the front upper portion 22*c* of the left side panel 30 and extending vertically, a right reinforcing panel portion 33*b* coupled to an inner surface of the right side panel 31, extending vertically and facing the left reinforcing panel portion 33*a* in the vehicle width direction, and a connecting panel portion 33*c* connecting lower portions of the right and left reinforcing panel portions 33*b* and 33*a* in the vehicle width direction.

A shaft portion insertion hole 33*h* which overlaps the first through-hole 40 in the vehicle width direction and through which a shaft portion (for example, a shaft portion of a bolt) (not illustrated) rotatably supporting an upper end portion (refer to FIG. 1) of the rear cushion 7 is inserted is formed in the right and left reinforcing panel portions 33*b* and 33*a*. That is, the first through-hole 40 in the right and left side panels 31 and 30 and the shaft portion insertion hole 33*h* in the right and left reinforcing panels 33*b* and 33*a* constitute a common opening portion through which a shaft portion (for example, a shaft portion of a bolt) (not illustrated) rotatably supporting the upper end portion (refer to FIG. 1) of the rear cushion 7 is inserted.

Figure 5:
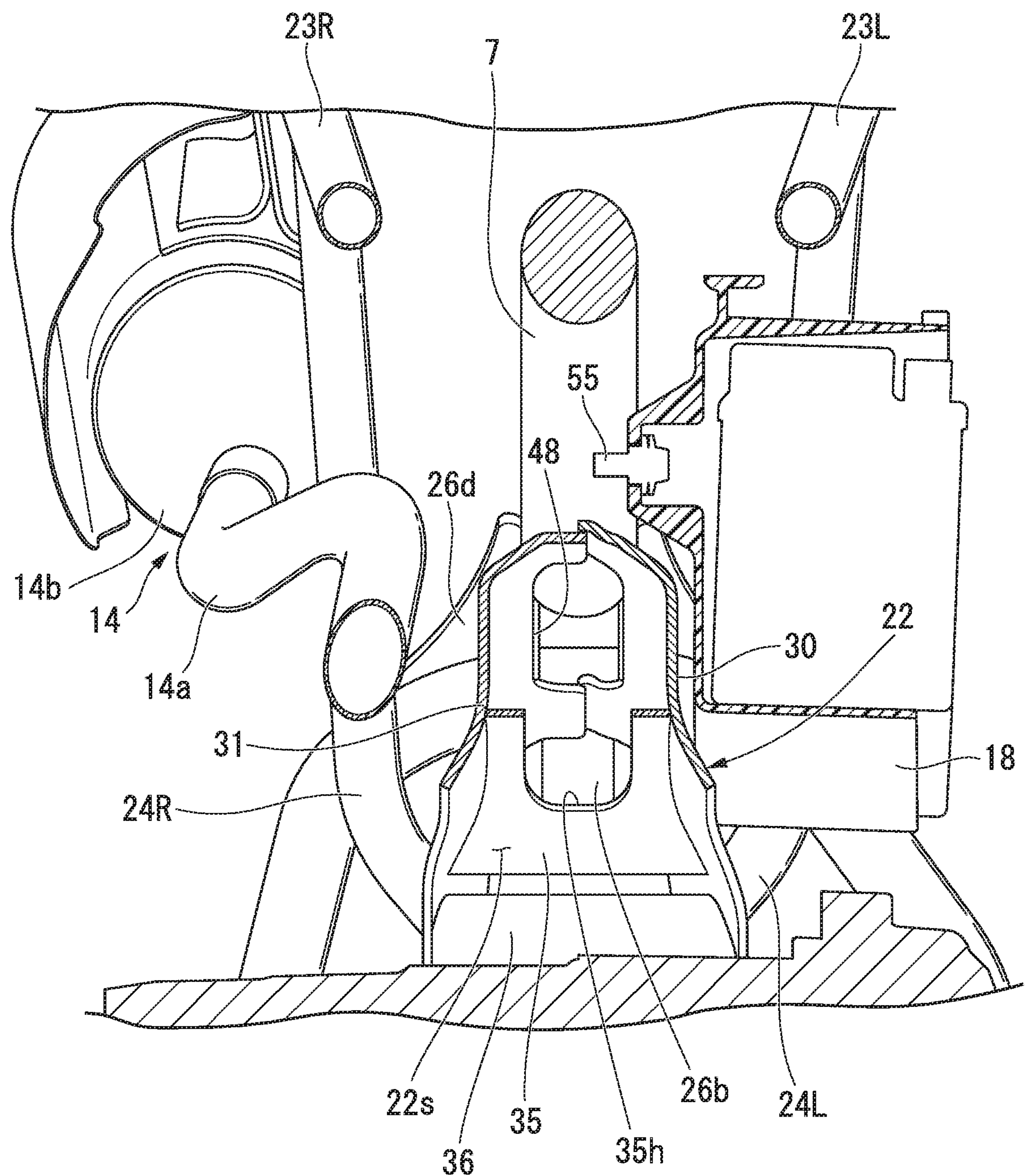
FIG. 5 is a view including a cross section taken along line V-V of FIG. 1.

As illustrated in FIG. 2, opening portions are formed in the rear panel 34, the first inner panel 35 (refer to FIG. 5) and the second inner panel 36. Specifically, in the rear panel 34, two opening portions 34*h* and 34*i* having a rectangular shape in a rear view are formed at intervals in the vertical direction. In the first inner panel 35 (refer to FIG. 5), a rectangular opening portion 35*h* (only a lower half of the opening portion 35*h* is illustrated in FIG. 5) having a vertically elongated length is formed. An opening portion 36*h* having a rectangular shape in a rear view is formed in the second inner panel 36. Thus, weight reduction of the rear vehicle body mono-frame 22 can be achieved.

Further, in FIG. 2, a reference numeral 50 indicates an upper gusset which connects an upper portion of the head pipe 20 and upper portions of the front end portions of the right and left front vehicle body frames 21R and 21L, a reference numeral 51 indicates a lower gusset which connects a lower portion of the head pipe 20 and lower portions of the front end portions of the right and left front vehicle body frames 21R and 21L, a reference numeral 52 indicates a rear cross member which connects rear end portions of the right and left seat frames 23R and 23L in the vehicle width direction, and a reference numeral 53 indicates a bracket coupled to a rear end portion of the right seat frame 23R.

As illustrated in FIG. 5, the rear vehicle body mono-frame 22 has a hollow structure. Specifically, an internal space 22*s* is formed between the right and left side panels 31 and 30 in the vehicle width direction. The exhaust pipe 14*a* as an exhaust component is provided on one side (one side) of the rear vehicle body mono-frame 22 in the vehicle width direction, and the battery 18 is provided as an electrical component on the other side (the other side) of the rear vehicle body mono-frame 22 in the vehicle width direction. Specifically, the exhaust pipe 14*a* is provided on a right side of the rear vehicle body mono-frame 22, and the battery 18 is provided on a left side thereof. Further, in FIG. 5, a reference numeral 55 indicates a fastening member (for example, bolt) which fixes the battery 18 to a bracket (not illustrated), and a reference numeral 56 indicates a battery installing portion (refer to FIG. 1) on which the battery 18 is installed.

As described above, in the vehicle body structure of the motorcycle 1, the embodiment includes a rear vehicle body mono-frame 22 which has the merging portion 22*a* for merging the pair of right and left front vehicle body frames 21 are provided with the front lower portion of the fuel tank 8 interposed therebetween behind the fuel tank 8 and below the seat 9, and which extends continuously to the front vehicle body frames 21.

According to such a constitution, as compared with a constitution in which two frames are provided below the seat 9, a vehicle width can be narrowed. Therefore, a straddling property of the seat 9 can be improved. Further, since the right and left front vehicle body frames 21 are provided with the front lower portion of the fuel tank 8 interposed therebetween and thus an upper space of the fuel tank 8 can be sufficiently secured, a capacity of the fuel tank 8 can be sufficiently secured. In addition, since the pair of right and left front vehicle body frames 21 are merged behind the fuel tank 8 and below the seat 9 and thus the front vehicle body frame 21 can be disposed to avoid an arrangement position of the fuel tank 8, a degree of freedom of a shape of the fuel tank 8 is increased, and the capacity of the fuel tank 8 can be easily secured.

Further, in the above-described embodiment, since the merging portion 22*a* is located in front of the imaginary line C2 which connects the middle point P1 of the seat 9 in the forward and rearward direction with the step 25 in the side view, the vehicle width can be narrowed in a range in which a driver crosses the seat 9 and moves her or his foot toward the step 25 (a region behind the imaginary line C2) as compared with the case in which the merging portion 22*a* is located behind the imaginary line C2 in a side view, and thus the straddling property of the seat 9 can be further improved.

Further, in the embodiment, since the exhaust pipe 14*a* is provided on the right side of the rear vehicle body mono-frame 22 and the battery 18 is provided on the left side thereof, the exhaust pipe 14*a* and the battery 18 can be arranged compactly in the vehicle width direction. Also, since the rear vehicle body mono-frame 22 has the hollow structure, the rear vehicle body mono-frame 22 serves as a heat insulating structure, and thus it is possible to prevent thermal influence between the exhaust pipe 14*a* and the battery 18.

Further, in the embodiment, since the rear vehicle body mono-frame 22 includes the engine installing portions 22*d*, 22*e*1, 22*e*2 and 22*e*3 on which the power unit 10 is installed and the cushion installing portion 22*c* on which the rear cushion 7 is installed, a load from the rear cushion 7 can be transmitted to the power unit 10 through the rear vehicle body mono-frame 22, and thus the power unit 10 can be further used as a rigid member which receives a load from a rear of the vehicle.

Further, in the embodiment, since the front lower engine installing portion 22*d* and the cushion installing portion 22*c* vertically overlap each other at least partially in a side view, the load from the rear cushion 7 can be easily received directly by the power unit 10 as compared with the case in which the front lower engine installing portion 22*d* and the cushion installing portion 22*c* are displaced in the vertical direction, and thus the power unit 10 can be further used as the rigid member.

Further, in the embodiment, since the rear vehicle body mono-frame 22 has the fuel tank installing portion 32*a* on which the fuel tank 8 is installed, it is unnecessary to additionally provide a bracket for installing the fuel tank 8, and thus the number of components can be reduced, and a weight can be reduced.

Further, in the embodiment, since the fuel tank 8 is provided on the same axial line as the cushion axial line C1, as compared with the case in which the fuel tank 8 is provided at a position deviated from the cushion axial line C1, the load from the rear cushion 7 can be transmitted to the head pipe 20 through the fuel tank 8 in addition to the right and left front vehicle body frame 21 during deceleration or the like, and the front wheel 3 can be further grounded on the ground. Therefore, it is possible to shorten a braking distance.

Further, in the embodiment, since the rear vehicle body mono-frame 22 includes the fuel tank installing portion 32*a* on which the fuel tank 8 is installed and the fuel tank installing portion 32*a* is supported by the cushion installing portion 22*c* on which the rear cushion 7 is installed, relative positional accuracy between the rear cushion 7 and the fuel tank 8 can be increased.

Further, in the embodiment, since the rear vehicle body mono-frame 22 includes the cushion installing portion 22*c* on which the rear cushion 7 is installed and the reinforcing panel 33 which reinforces the cushion installing portion 22*c* and the welded portion 23*w* of the seat frame 23 is provided to surround the outer circumference of the joint portion 41 between the cushion installing portion 22*c* and the reinforcing panel 33, stress can be received by the seat frame 23, and thus the stress can be prevented from being concentrated on the joint portion 41 between the cushion installing portion 22*c* and the reinforcing panel 33.

Further, in the embodiment, the example in which the right and left front vehicle body frame 21 is provided with the front lower portion of the fuel tank 8 interposed therebetween has been described, but the present invention is not limited thereto. For example, the right and left front vehicle body frames 21 may be provided with the rear lower portion of the fuel tank 8 interposed therebetween. That is, the right and left front vehicle body frames 21 may be provided with at least a part of the fuel tank 8 interposed therebetween.

Further, in the embodiment, the example in which the exhaust pipe 14*a* is provided on the right side of the rear vehicle body mono-frame 22 and the battery 18 is provided on the left side of the rear vehicle body mono-frame 22 has been described, but the present invention is not limited thereto. For example, the exhaust pipe 14*a* may be provided on the left side of the rear vehicle body mono-frame 22 and the battery 18 may be provided on the right side thereof.

Further, in the embodiment, the example in which the exhaust pipe 14*a* is used as an exhaust part and the battery 18 is used as an electrical component has been described, but the present invention is not limited thereto. For example, the exhaust part may be the muffler 14*b*. For example, the electrical component may be an engine control unit (ECU).

Further, in the embodiment, the example in which the exhaust component is provided on one side of the rear vehicle body mono-frame 22 in the vehicle width direction and the electrical component is provided on the other side thereof in the vehicle width direction has been described, but the present invention is not limited thereto. For example, the exhaust part may be provided on one side of the rear vehicle body mono-frame 22 in the vertical direction, and the electrical component may be provided on the other side thereof in the vertical direction. That is, the exhaust component may be provided on one side of the rear vehicle body mono-frame 22, and the electrical component may be provided on the other side thereof.

Figure 6:
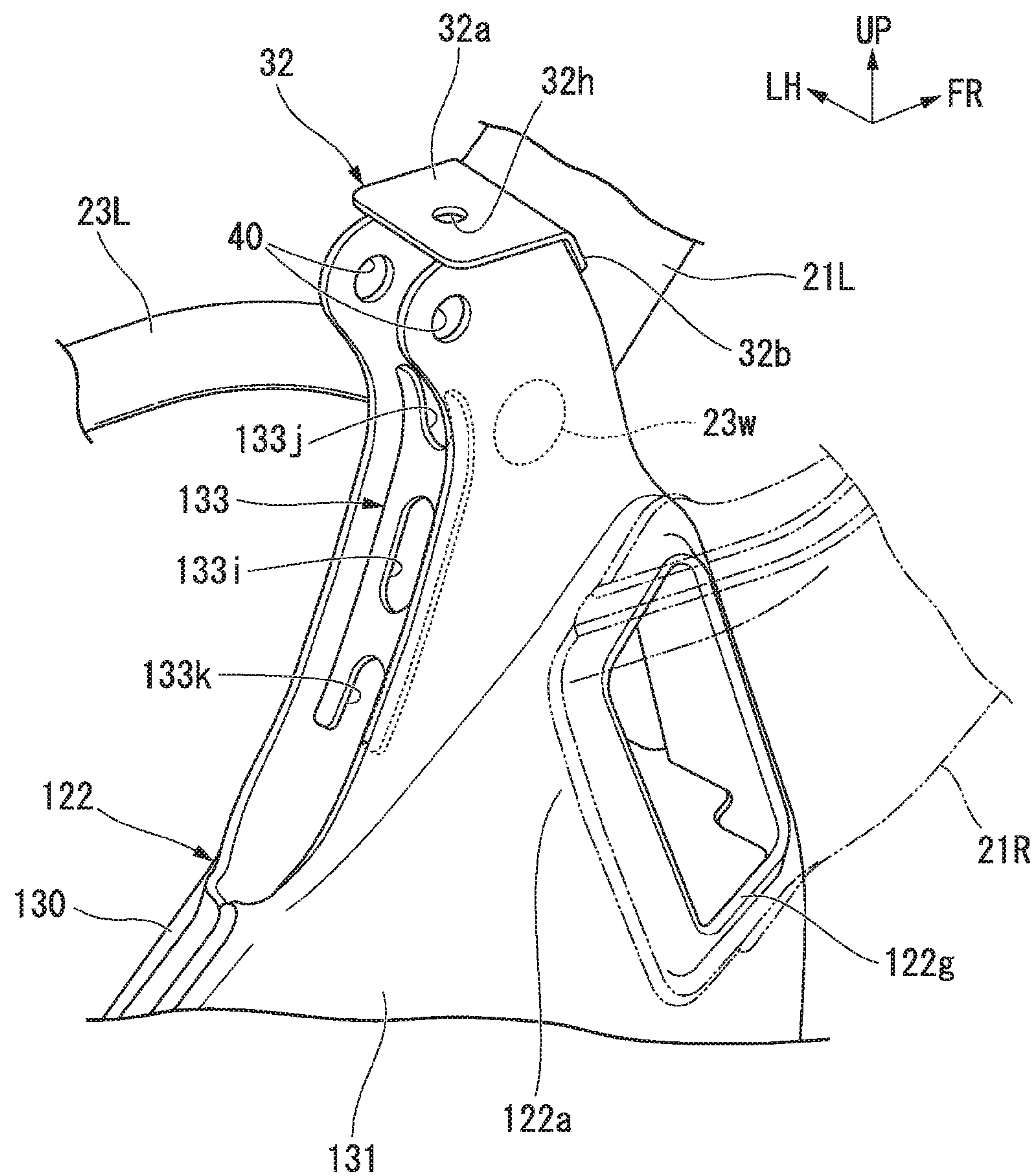
FIG. 6 is a perspective view of a cushion installing portion in a vehicle body structure according to a modified example of the embodiment.

Further, as illustrated in FIG. 6, a rear vehicle body mono-frame 122 may have an inward extending portion 122*g* extending to inner surfaces of the rear end portions of the right and left front vehicle body frames 21R and 21L at a merging portion 122*a* of the right and left side panels 131 and 130. The inward extending portion 122*g* is formed in a rectangular frame shape having a vertically elongated shape along the inner surfaces of the rear end portions of the right and left front vehicle body frames 21R and 21L in the merging portion 122*a*.

Figure 7:
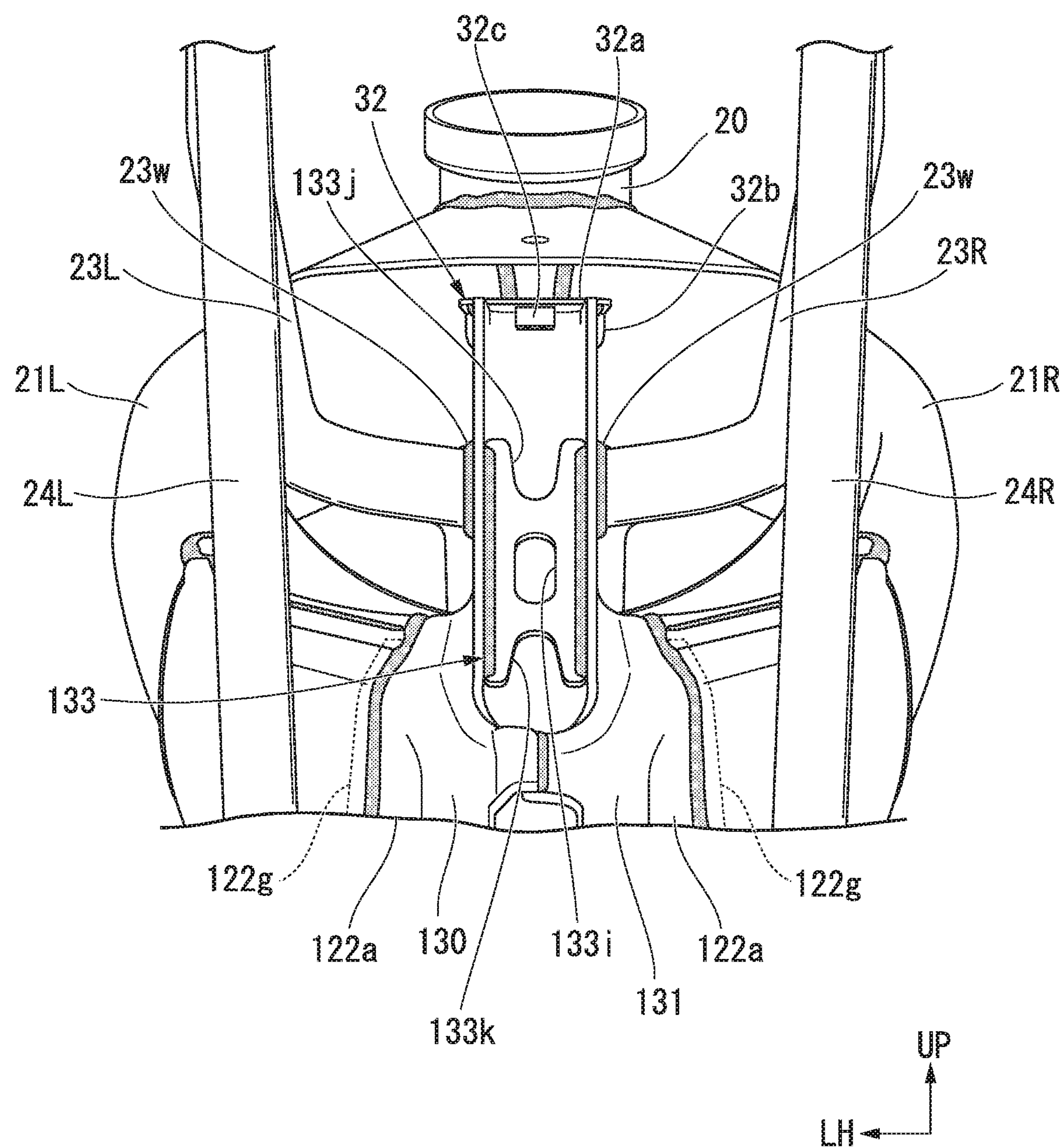
FIG. 7 is a rear view of the vehicle body structure according to the modified example of the embodiment.

Further, in the embodiment, the example in which the reinforcing panel 33 has a U shape in the rear view has been described, but the present invention is not limited thereto. For example, in the rear view of FIG. 7, the reinforcing panel 133 may have a ladder shape extending vertically. Specifically, a rectangular opening portion 133*i* having a vertically elongated shape in a rear view is formed in the reinforcing panel 133. An upper U-shaped cutout portion 133*j* is formed in an upper end portion of the reinforcing panel 133 in the rear view. A lower cutout port 133*k* having a U shape (inverted U shape) protruding upward in the rear view is formed in a lower end portion of the reinforcing panel 133. Further, in FIG. 7, hatched portions (dot-hatched portions) indicate welded portions.

Further, in the embodiment, the example in which the second through-hole 41 (refer to FIG. 3) for welding the right and left side panels 31 and 30 and the reinforcing panel 33 is formed in the front upper portions 22*c* of the right and left side panels 31 and 30 on the front lower side of the first through-hole 40 has been described, but the present invention is not limited thereto. For example, as illustrated in FIG. 6, the second through-holes 41 (refer to FIG. 3) may not be formed in the right and left side panels 131 and 130. Further, in FIG. 6, illustration of the right seat frame 23R is omitted.

The present invention is not limited to the above-described embodiment. For example, a saddle type vehicle includes all vehicles in which the driver rides while straddling the vehicle body and thus includes not only motorcycles (including a bicycle with a prime mover and a scooter type vehicle) but also three-wheeled (including two-front-wheeled and one-rear-wheeled in addition one-front-wheeled and two-rear-wheeled vehicles) vehicles. Furthermore, the present invention can be applied not only to motorcycles but also to four-wheeled vehicles such as automobiles.

Although the engine according to the embodiment is an engine having the cylinder portion 12 (forward inclined cylinder) protruding forward and upward, it may be an engine having a cylinder portion (rearward inclined cylinder) protruding rearward and upward. Also, the engine is not limited to a so-called lateral engine in which the crankshaft is arranged in the vehicle width direction, and it may be a so-called vertical engine in which the crankshaft is arranged in the forward and rearward direction of the vehicle, and also in this case, the cylinder may be arranged in various manners. Further, the power unit 10 may include an electric motor as a drive source.

Additionally, the constitution in the above embodiment is an example of the present invention, and various modifications are possible without departing from the gist of the present invention, such as replacing the elements of the embodiment with well-known elements.

What is claimed is:

1. A vehicle body structure of a motorcycle comprising:

a rear vehicle body mono-frame having a merging portion configured to merge a pair of right and left front vehicle body frames provided with at least a part of a fuel tank interposed therebetween below a seat, and also configured to extend continuously to the front vehicle body frames, wherein:

the rear vehicle body mono-frame comprises an engine installing portion on which an engine is installed, and a cushion installing portion on which a cushion is installed, and the engine installing portion and the cushion installing portion vertically overlap each other at least partially in a side view.

2. The vehicle body structure of a motorcycle according to claim 1, wherein the merging portion is located in front of an imaginary line configured to connect a middle point of the seat in a forward and rearward direction with a step in the side view.

3. The vehicle body structure of a motorcycle according to claim 1, wherein the rear vehicle body mono-frame has a hollow structure, an exhaust component is provided on a first side of the rear vehicle body mono-frame, and an electrical component is provided on a second side of the rear vehicle body mono-frame opposite the first side.

4. The vehicle body structure of a motorcycle according to claim 1, wherein the rear vehicle body mono-frame comprises a fuel tank installing portion on which the fuel tank is installed.

5. The vehicle body structure of a motorcycle according to claim 1, wherein the fuel tank is provided on a same axial line as a cushion axial line.

6. The vehicle body structure of a motorcycle according to claim 5, wherein the rear vehicle body mono-frame comprises a fuel tank installing portion on which the fuel tank is installed, and the fuel tank installing portion is supported by a cushion installing portion on which a cushion is installed.

7. The vehicle body structure of a motorcycle according to claim 1, wherein the rear vehicle body mono-frame comprises a cushion installing portion on which a cushion is installed, and a reinforcing portion configured to reinforce the cushion installing portion, and wherein a welded portion of a seat frame is provided to surround an outer circumference of a joint portion between the cushion installing portion and the reinforcing portion.

* * * * *